United States Patent [19]

Williamson

[11] 4,278,186

[45] Jul. 14, 1981

[54] METHOD AND APPARATUS FOR BEVERAGE DISPENSING CONTROL AND QUANTITY MONITORING

[76] Inventor: Robert D. Williamson, 7350 NW. First Ct., Pembroke Pines, Fla. 33024

[21] Appl. No.: 940,464

[22] Filed: Sep. 8, 1978

[51] Int. Cl.³ .............................................. B67D 5/08
[52] U.S. Cl. ..................................... 222/36; 222/70; 235/92 FL
[58] Field of Search .................. 222/23, 36, 37, 70, 222/129.1, 129.3; 235/92FL

[56] References Cited

U.S. PATENT DOCUMENTS

| | | | |
|---|---|---|---|
| 3,170,597 | 2/1965 | Reichenberger | 222/36 |
| 3,257,034 | 6/1966 | Dumm | 222/36 |
| 3,688,947 | 9/1972 | Reichenberger | 222/129.1 X |
| 3,897,887 | 8/1975 | Goldberg | 222/26 |

Primary Examiner—Joseph J. Rolla
Attorney, Agent, or Firm—Robert J. Van Der Wall

[57] ABSTRACT

A beverage dispensing control and quantity monitoring system includes a transponder to transmit a signal from a control cap placed on a liquor bottle to a receiver system and then to a data processing device. The cap fits on the bottle and contains an electronic package which will meter an exact amount of beverage when tilted, thus controlling the amount poured. The cap also transmits to the receiver such data as the operator or bartender pouring the beverage, the type of beverage, the amount of beverage, and any other necessary data such as when the cap is removed from the bottle, when the battery therein is low, etc. This is accomplished using a plurality of data bits preprogrammed into each bottle cap which are serialized using a shift register. The serialized data gates the output of an LF oscillator. A separator HF signal transmitted from the vicinity of the bottlecap is mixed in a nonlinear device with the gated LF oscillator output and radiated to a remote receiver and data processing device.

6 Claims, 5 Drawing Figures

METHOD AND APPARATUS FOR BEVERAGE DISPENSING CONTROL AND QUANTITY MONITORING

BACKGROUND OF THE INVENTION

The invention relates to the field of beverage control and record keeping devices, and more particularly, to the area of automatic record keeping using data processing devices in combination with inexpensive radio equipped bottle caps.

It is well known that the dispensing of expensive beverages such as liquor must be carefully monitored to avoid waste and pilferage. The management of establishments such as bars and taverns have long found it necessary to carefully monitor the relationship between liquor dispensed and the receipts. Historically, this has usually necessitated personal attendance of at least one owner of the business.

In recent years there have also been several patents granted for systems and devices aimed at recording and counting the amount and types of liquor dispensed by bar tenders and relating same to the monetary receipts. Such inventions include U.S. Pat. Nos. 3,170,597, 3,599,833, 3,688,947, and 3,993,218, all issued to Reichenberger. In addition there is U.S. Pat. No. 3,428,218 issued to Coja. In general, these inventions represent large, space consuming, cumbersome, and expensive investments for the management of liquor dispensing establishments, frequently requiring major renovations to already crowded bar facilities. Many are also difficult to maintain and disabling to the business when the equipment is not operative. Moreover, most of the prior art devices have been unattractive to the customers since they do not simulate conventional pouring methods, and cause customers to be apprehensive about the amount and type of liquor being poured.

In recent years, liquor dispensing establishments have utilized a mechanical measuring device in the form of an enlarged bottle cap having a spout which meters out one jigger of liquor and then stops to indicate both to the customer and the bartender that the measured quantity of liquor has been poured. Despite the fact that such devices do not monitor the relationship between the amount of liquor poured and the receipts therefor, these measuring devices are in widespread use because they at least provide a simplified convenient, and reliable measuring device for both bartender and customer. These mechanical measuring devices are simply moved from an empty bottle to the next full bottle as needed. Since they are in widespread use, they also enjoy almost universal acceptance by customers and bartenders. The control cap of the present invention includes a size and shape comparable to these mechanical devices already in such common use. It therefore will not even be apparent to the customer that the present invention is in use, thereby insuring customer acceptance.

Of course, it is clear that such a system must include true portability wherein the liquor bottles can be moved about freely without any wires or other attachments thereto, that the caps must be readily removable by the bartender to change bottles when one bottle is emptied and a new bottle is to be initiated, and that this procedure must in itself result in a signal so that the number of bottles of liquor consumed can be related to the receipts. The number of bottlecaps necessary for effective use of the invention must of course be large, the system must provide certain identification of each bottle from each other bottle, and the system must provide for almost instant expansion in the number of bottles. In addition, where multiple bars are used in proximity to one another, the system must differentiate from the various bars without interference with each other. Moreover, because of the large number of bottle caps to be employed, they must be of extremely low cost manufacture, be readily programmable only by the operator of the equipment, but not by bartenders or customers, be of sufficient range to permit remote location of the receiving and data processing devices, while at the same time utilizing a bottle cap circuitry of extremely low power consumption to maximize the life of a minute battery contained therein. Further means should be provided for the operator of the equipment to know when a given bottle cap battery is reaching a low power and requiring replacement for continued effective operation. Reliable operation and minimal maintenance are enhanced by minimizing the number of moving parts, which is one of the evident shortcomings of the prior art.

At the same time, a practical device must permit a plurality of pour sizes on a given cap, and that cap must be capable of transmitting an appropriate signal for each such size. The latter feature is substantially required by the necessity to pour mixed drinks involving a variety of different ingredients and quantities thereof.

SUMMARY OF THE INVENTION

With the foregoing in mind, it is a primary object and advantage of the present invention to provide a system for the dispensing of expensive beverages such as liquor requiring careful monitoring to avoid pilferage and waste and to provide a means for controlling the relationship between the amount of liquor dispensed and the monetary receipts.

It is another primary object and advantage of the invention to provide an effective system and method for control and monitoring of a liquor dispensing business without the physical attendance of owner or other responsible party.

A related object and advantage of the invention is to accomplish the foregoing objects and advantages without large space consuming, cumbersome and expensive equipment which may require major renovations to existing bar facilities.

A further object and advantage is to provide an apparatus requiring low maintenance and which will not be disabling to a liquor dispensing establishment if the equipment should not be operative.

An additional object and advantage is to provide a system for monitoring the relationship between liquor dispensed and the receipts, including identification of the type of liquor and the bartender pouring same, while closely simulating conventional pouring methods.

One more object and advantage of the invention is to utilize such a system which will not be unattractive to the customer or cause the customer apprehension about the amount or type of liquor being poured.

A related object and advantage of the invention is to utilize such a system having the appearance of present mechanical measuring bottlecaps, thereby insuring customer and bartender acceptance from an appearance point of view.

An allied object and advantage of the invention is true portability of the monitored liquor bottles resulting with no wires or other attachments thereto.

An additional correlated object and advantage of the invention is to permit the use of bottle control caps which are readily removable by bartenders when one bottle is empty and when another bottle is to be started, which may be done so rapidly that it can be accomplished in the middle of pouring a single drink, but which procedure results in a signal indicating that a new bottle of liquor has been begun, thereby permitting monitoring of the number of bottles consumed, and preventing the bartender from short circuiting the system by removing the bottlecap from the bottle to pour without monitoring by the system.

A further primary object and advantage of the invention is to provide a system with certain identification of a very large number of bottles so as to allow the monitoring of liquor from a great variety of different brands and types of liquor, a plurality of different bartenders, and even a plurality of different bars within the same establishment. This object and advantage of the system is to be accomplished at extremely low cost without a transmitter of sufficient power or range to require FCC approval of each bottlecap and to accomplish these objects with a very low cost reliable device.

In this aspect of the invention, it is a resulting object and advantage of the invention to provide a bottlecap which is readily programmable and therefore identifiable by the operator of the equipment, but which programming cannot be tampered with by bartenders or customers.

An additional object and advantage of the invention is to provide a bottlecap transmitter having sufficient range to permit remote location of the receiving and data processing devices while at the same time utilizing a bottlecap circuitry of extremely low power consumption to maximize life of a minute battery contained in the bottlecap.

One more object of the invention is to provide a means for the operator of the system to know when a given bottlecap battery is low and requires replacement for continued effective operation of that bottlecap.

A further object and advantage of the invention is to provide a method and apparatus to achieve the foregoing objects and advantages with a system having a minimum of moving parts to enhance reliability and provide for a minimum maintenance, thereby effecting significant improvement over the prior art.

An additional advantage and object of the invention is to provide a method and apparatus for a practical control device having the facility to permit a plurality of pour sizes in a given cap with that cap being capable of transmitting appropriate signals for each such pour size. That facility provides the capability to prepare mixed drinks requiring a variety of different ingredients and quantities.

Other objects and advantages will become apparent upon reading the following descriptions of the invention and upon reference to the drawings.

In accordance with the invention there is provided a plurality of bottle caps containing therein electronic circuitry and a power source, generally a small disc battery, since the bottlecaps use extremely small amounts of power. Remote from the bottlecaps at any convenient location is placed a data processing device for accumulation of data transmitted to it by the bottlecaps. The input of the data processing device is coupled to a receiver amplifier.

The bottle control cap contains at least one flow passage, valve, and venting means as well as the electronics components. Following the power source, a valve pour switch connects both a bottlecap monopulse generator, commonly known as a "one shot", and a latch, powering all bottlecap power consuming circuits. Within the bottlecaps, internal connections go from the monopulse generator to a pour timer, a reset contact on a divider, and a load contact on a shift register. Included is a bottlecap valve opening and closing means, such as a solenoid coil not requiring continuous energization, in operative relationship to the valve and electrically connected respectively to a first and a second output from the valve pour timer. With regard to the valve, a pour switch activates the monopulse generator which in turn activates the pour timer opening the valve, timing out the period that the valve is open, and then closing the valve. During this interval the remaining electronics activity occurs during an extremely short time interval. The valve pour timer output closing the valve is also connected to a latch reset contact severing power to all bottlecap power consuming circuits, thereby greatly extending the life of the power source.

A first oscillator is located in the bottlecap, is preferably an LF oscillator, it is powered from the latch, is connected to a clock contact point on the divider and is also connected into a first input of an AND gate. The divider, which had been reset by the monopulse generator, has an output connected to a clock contact on the shift register.

Each bottlecap is provided with a plurality of data programming switches to which access is limited. Said data programming switches are used to identify each bottlecap from each other, thereby being used to identify the brand of liquor or other beverage on which the bottlecap is used, the bartender to which it is assigned, and which of several bars it may be used at. The switches are also connected to a device which will send a signal that the top has been removed, thereby signaling the system that a new bottle has been initiated, and a battery level circuit is connected to another of the switches to signal a low battery condition. In addition, multiple pour sizes and other data can be programmed into the switches, which are in parallel. Access to at least some of said switches is obviously limited to the operator of the equipment, excluding tampering by bartender or customers. Each of the programming switches is in contact with at least one of the inputs to the shift register, said inputs being in parallel to each other, but in series with corresponding programming switches.

The shift register serves the purpose of converting the parallel input into serial output, which is fed to the AND gate. As noted above the AND gate has also been connected to the output of the first oscillator and the result is the gating out of a series of pulses corresponding to the preprogrammed data bits used to identify and providing other data about each control cap. The pulses are then passed through a capacitor to remove the DC component therefrom, and then travel through a transformer to alter the impedance thereof to a level matching one or more control cap antennae. The antennae are also contained within the cap and radiate the signal to remote equipment which includes another antenna, a receiver amplifier, and data processing equipment which records, stores, and reports on data transmitted from all of the bottlecaps. The remote equipment can be placed at any location within range of the bottlecap transmissions, and therefore need not interfere with the usually crowded condition in bar facilities. Of course, no renovation is required of the bar facilities either, since the bottlecaps simply replace such caps that are mechanical measuring devices in present use.

In the preferred embodiment of the bottlecap, the pulses are additionally passed through chokes which are connected to both ends of the secondary winding of the impedance altering transformer. The pulses are then conducted to, and impressed upon, a nonlinear device which in turn is connected to two antennae. In this embodiment, certain additional equipment is also provided in the remote location. This includes additional remote equipment on HF oscillator, which is connected to a directional coupler, which in turn is connected to the antenna. An HF signal is sent out and blankets the entire area where control caps are in use. The control caps receive the HF signal, mix it in the control cap nonlinear device with the pulses which have been impressed thereon, creating thereby a composite signal. The control cap antennae are then used to radiate the composite signal back to the remote location where it passes through the directional coupler to an HF detector. The HF detector removes the HF signals from the composite signal, passing the pulse data to a receiver amplifier, and thence to the data processing device.

Also in accordance with the invention there is provided a method for beverage dispensing control and quantity monitoring. Initially, a typical control cap is programmed to identify the cap, including such data as the bartender, the brand, a battery level switch, etc. All such bottlecaps would be so programmed. Certain externally available switching may also be provided which would permit the bartender to vary the amount of beverage poured, for the purpose of making mixed drinks to order. In that circumstance, additional data bits are determined at the time of the pour by the bartender. These would, of course, not be of limited access.

The control cap would be energized, with a pour switch, which could be in the form of a mercury switch or a manual device or both. The pour switch would activate various circuits including a valve opening and closing means, a valve pour timer, an oscillator, a divider connected to the oscillator output, and a shift register connected to both the output of the divider and the energizing power source. The data bits would then be serialized by the energized shift register and conducted with another output of the oscillator through an AND gate, which would gate pulses corresponding to the serialized data bits. The next steps are removing a DC component from the pulses, transforming the impedence of the pulses to a level matching the control cap antennae, conducting the pulses to the control cap antennae radiating that signal to a remote antenna, passing that signal to a receiver amplifier, and finally, sending an amplified signal to a data processing device for accumulation, recording, and reporting data from all such bottlecaps. At the time that the valve is closed with a signal from the pour timer, power would be shut off to all power consuming bottlecap circuits to greatly extend the life of the power source in the bottlecap.

The method described above would also include the preferred embodiment involved in passing the pulses through chokes connected to both ends of the secondary winding in the impedance transformer, conducting the pulses to, and impressing them upon a nonlinear device, transmitting HF signals from a remote oscillator connected to a directional coupler and an antenna, receiving the HF signal with the control cap antennae and mixing same in a nonlinear device in the control cap with the pulses impressed thereon, thereby creating a composite signal, radiating that signal as a composite to the remote transmitting and receiving antennae, passing the composite signal through the directional coupler to an HF detector, removing the HF signals from the composite signal using that HF detector, and conducting the output of the HF detector to the receiver amplifier.

The invention will be better understood after reading the following detailed description of the embodiments thereof with reference to the appended drawings, in which:

DETAILED DESCRIPTION

Figure 1:
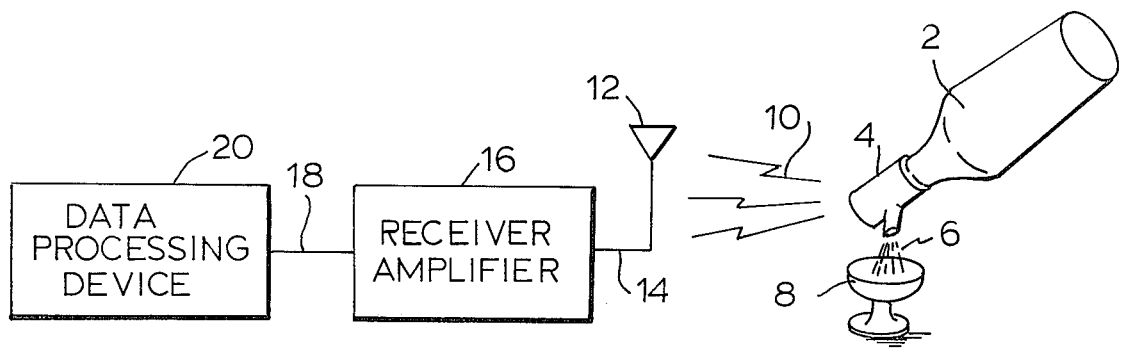
FIG. 1 is a combination perspective and schematic diagram of one embodiment of the system showing a bottle and bottlecap being used to pour a drink and transmitting the data to remote equipment, shown in schematic form.

FIG. 1 shows a beverage bottle 2 tipped and pouring through bottle control cap 4 a beverage 6 into cocktail glass 8. Electronic signals 10 are sent from the bottlecap to an antenna 12 which is connected by a conductor 14 to a receiver amplifier 16. The receiver amplifier 16 is connected by conductor 18 to data processing device 20. Data processing device 20, receiver amplifier 16, and antennae 12 are all intended to receive signals from a great number of bottle control caps, typically shown at 4.

Figure 2:
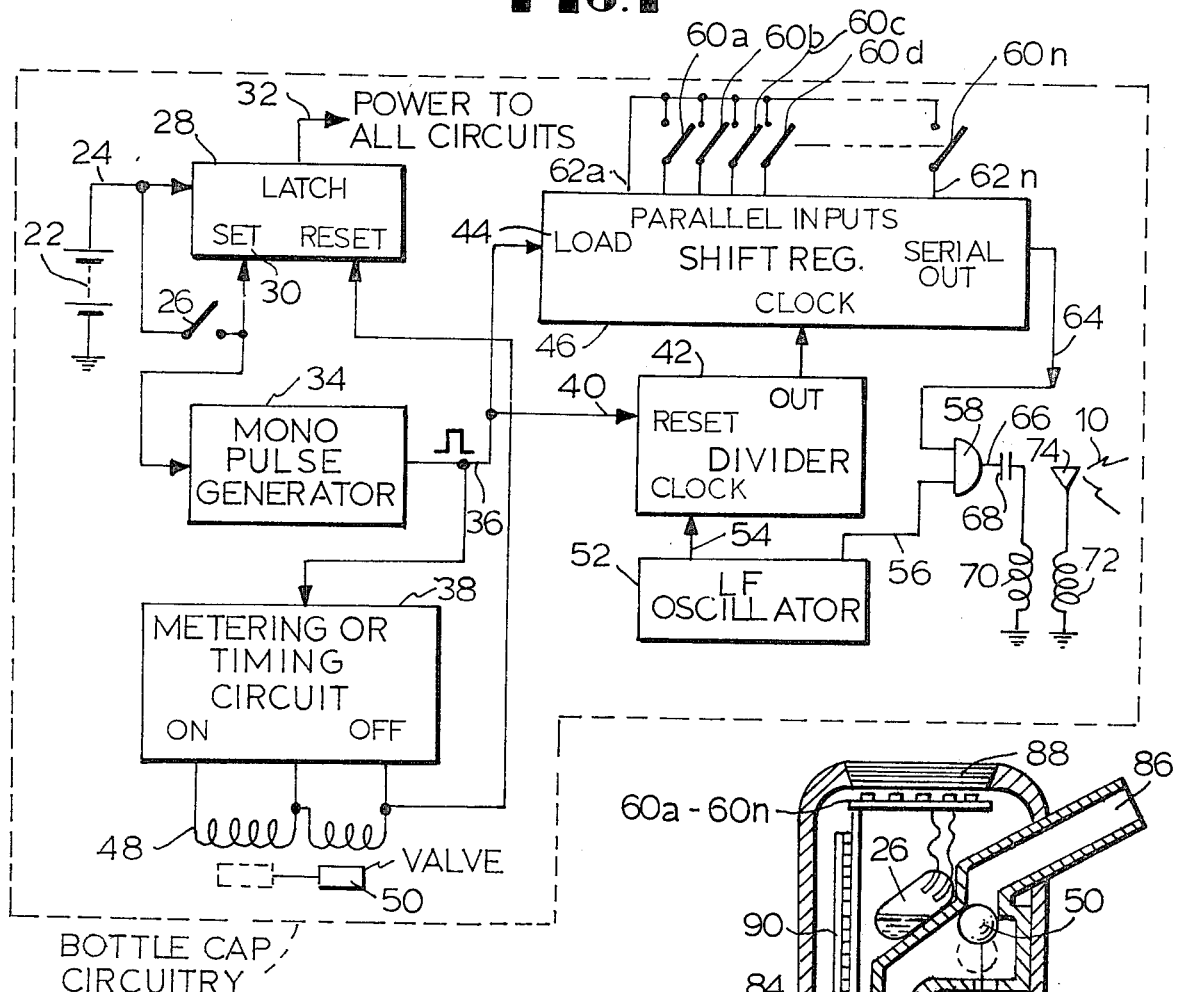
FIG. 2 is a schematic diagram of the electrical circuitry within a typical bottle cap.

Turning to FIG. 2, a typical circuit diagram of an alternative embodiment of the bottle control cap is shown. A battery or other power source 22 is connected through line 24 to pour switch 26. It is also connected to latch 28. Pour switch 26 may be manually activated, or may be automatically activated in the manner of a mercury switch, which would be activated by tipping of the cap. A manual switch may also be in series thereto. Pour switch 26 is connected to the set contact 30 of latch 28, and latch 28, when set, provides power at 32 to all circuits in the bottlecap. Pour switch 26 also provides power to monopulse generator 34, commonly known as a "one shot". Monopulse generator 34, when activated by pour switch 26, provides power via a conductor 36 to pour valve timer 38, to the reset contact 40 of divider 42 and to the load contact 44 of shift register 46.

When valve pour timer 38 is energized by power from conductor 36, it activates valve opening and closing means 48, which in turn opens valve 50 shown schematically in this diagram. While pour timer 38 is timing out the pour, all the remaining electronics activity hereinafter described takes place during an extremely short time interval. Then valve pour timer 38 activates valve opening and closing means 48, closing valve 50, and simultaneously transmitting a signal to the latch 28, resetting same and thereby severing power to all power consuming circuits in the bottle cap 4. This greatly increases the life of power source 22.

Power from conductor 32 is also used to energize LF oscillator 52 having an output at 54 to divider 42. Another output of oscillator 52 travels via conductor 56 to an AND gate 58.

A group of parallel data programming switches 60a, 60b, 60c, 60d . . . 60n are provided as inputs to shift register 46. At least some of these N switches are behind a limited access cover plate for preprogramming by the operator of the equipment, but not permitting tampering by bartenders, customers or other persons who come in contact with bottle control caps. However, at least a few of these switches may be connected to external controls intended for use by the bartender for purposes of varying the amount of liquor poured for making mixed drinks requiring varying ratios of beverage in accordance with the tastes of the customer. The data programming switches 60a through 60n are of course connected to parallel input contacts 62a through 62n of shift register 46. When load contact 44 of shift register 46 is energized from monopulse generator 34 by means of conductor 36, shift register 46 serializes, in binary form, the data bits programmed into the bottle cap utilizing data programming switches 60a through 60n. This serialized output is transmitted along conductor 64 to and gate 58 where it is combined with the low frequency output from oscillator 52 simultaneously sent to AND gate 58 via conductor 56. This effectively gates out pulses corresponding to the data bits, preprogrammed into the bottlecap, along conductor 66 to DC component removing capacitor 68 and impedance transformer 70-72. Thereafter the pulses are sent to antennae 74 for transmission as electronic waves at 10 to the remote equipment.

Figure 3:
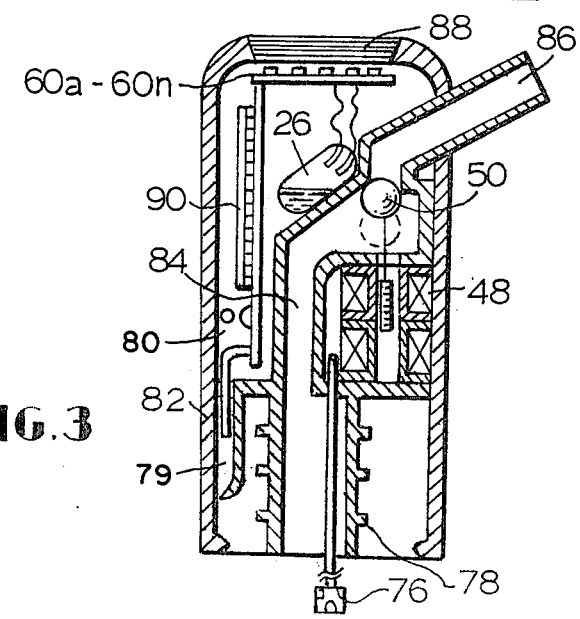
FIG. 3 is a cross-sectional view of a typical bottlecap.

In FIG. 3, a cross-sectional view of typical bottlecap 4 is shown. Venting means 76 extends below the bottlecap. Gripping surfaces 78, preferably of a slightly resilient character, are provided for contact with the top of the bottle. Downwardly depending resilient surface 79 deflects from its normal position where the bottlecap 4 is placed on a bottle 2. Cap removal switch 80 is provided to send a signal that the cap is being removed and a new bottle is being initiated. Cap removal switch 80 is normally open but is held closed by member 79 when bottlecap 4 is on a bottle 2. This same cap removal switch 80 would effectively prevent a bartender from pouring extra drinks "on the house" by removing the cap, since removal of the cap from the bottle simply signals that a new bottle has been initiated. The bottlecap is surrounded by housing 82, contains flow passages 84 which are interrupted by valve 50 connected to valve opening and closing means 48. Flow passages 84 are of a size comparable to that used in present liquor bottlecap measuring devices, and they terminate in a pour spout 86. The housing also contains pour switch 26 which may be manual, or contain a manual override, but is illustrated as a mercury switch. At the top of housing 82 is contained a selectively removable cover 88 which limits access to data programming switches 60a through 60n. However, bottle remover switch 80 is considered one of this series. The remainder of the electronic circuitry shown in FIG. 2 is contained in module 90, which may be in the form of a miniature printed circuit or "chip".

Figure 4:
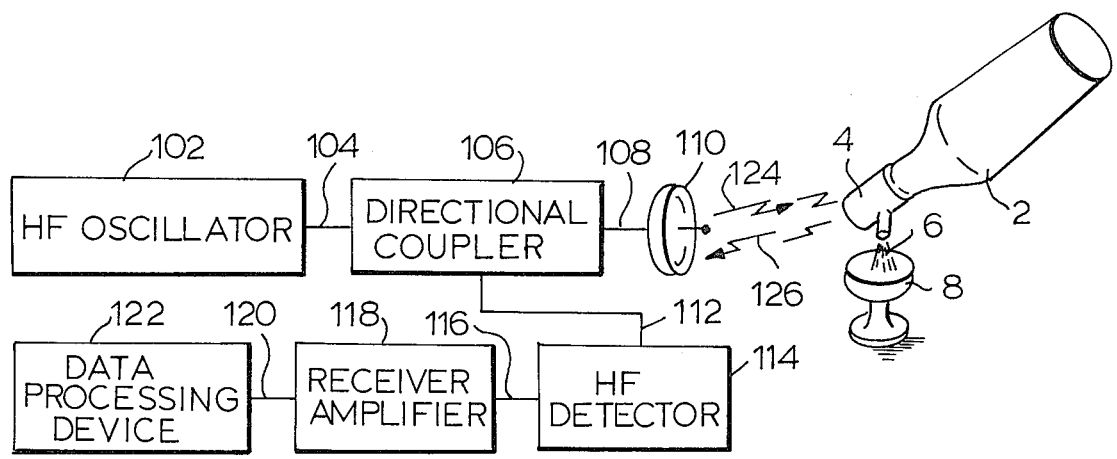
FIG. 4 is a combination perspective and schematic diagram showing the preferred embodiment of the invention and showing the circuit of the remote equipment in schematic form.

Turning now to FIG. 4, the preferred embodiment of the invention is shown in combination perspective and schematic with a beverage bottle 2, typical bottlecap 4 tipped to pour beverage 6 into glass 8. In the remote location, HF oscillator 102 provides a high frequency (HF) output along conductor 104 to directional coupler 106 and conductor 108 to signal transmitting and receiving antenna 110. This signal is transmitted thereby as an electronic wave at 124 to the area in which all bottlecaps are being used. Subsequently, it returns mixed with a series of pulses representing the preprogrammed data bits in a given bottlecap as composite signal 126. That signal is then received with antenna 110, sent via conductor 108 to directional coupler 106 where it is diverted to conductor 112 en route to HF detector 114. HF detector 114 removes the HF signal from the composite signal 126 and presents a low frequency signal via line 116 to receiver amplifier 118. The receiver amplifies this signal, demodulates it, and puts out the signal on line 120, analogous to the data that has been sent from data programming switches 60a through 60n of bottlecap 4, to data processing device 122.

Data processing device 122 is, of course, programmed to accept, record, and report on data received from all of the bottlecaps 4 in the system.

Figure 5:
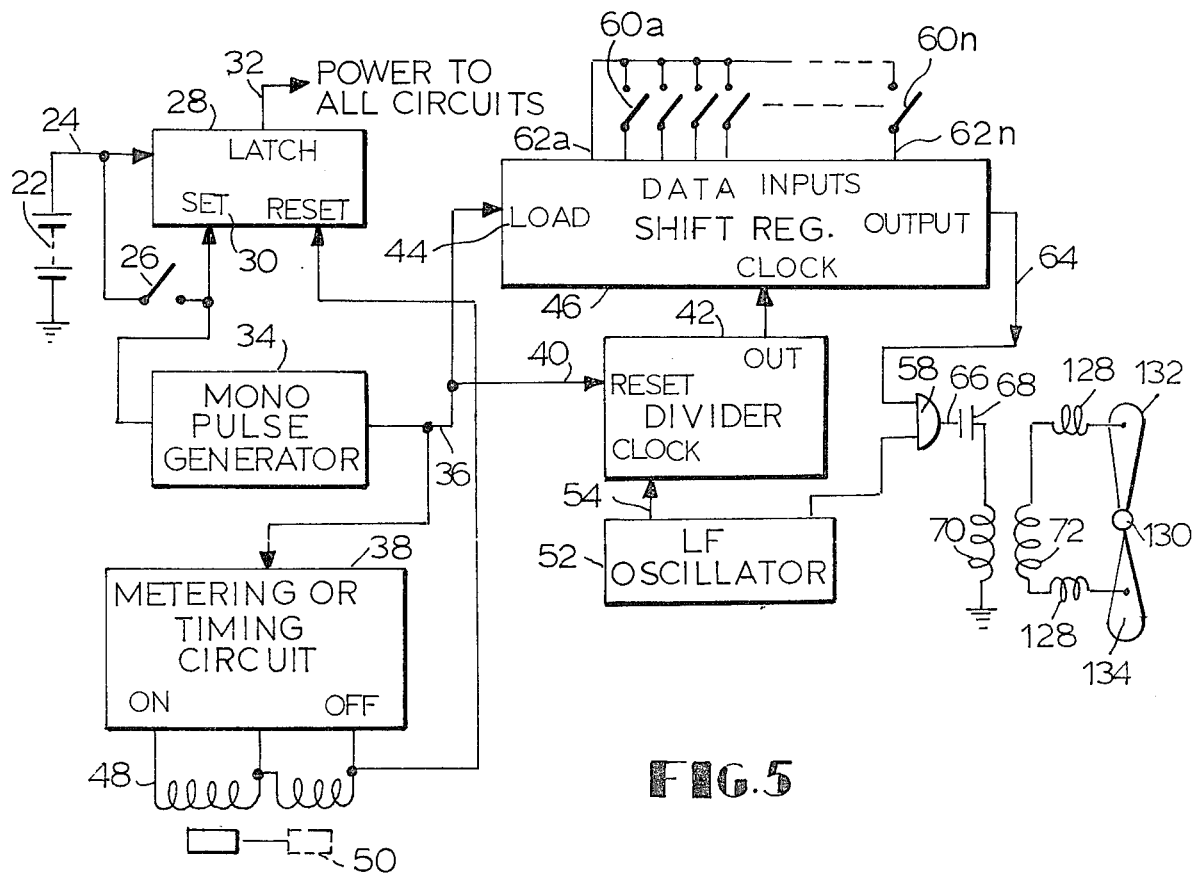
FIG. 5 is a circuit diagram of the preferred embodiment of the bottlecap circuitry.

Turning finally to FIG. 5, the circuitry for the preferred embodiment of the bottlecap is shown in schematic form. It is substantially identical to that shown in FIG. 2 at all points preceding DC component removing capacitor 68 and the description thereof will not be repeated preceding that point, although the reference numerals have been reapplied to the drawing. The description of FIG. 2 up to the point of capacitor 68 is incorporated at this point by reference as if fully recited.

The pulses after passing DC component removing capacitor 68 are then sent to transformer 70-72. However, in the preferred embodiment, the ends of secondary winding 72 are each taken through chokes 128 and then impressed across a nonlinear device 130 in contact with two antennae 132 and 134.

It will be recalled from above that an HF signal 124 had been transmitted to the vicinity of bottlecap 4, and this HF signal is picked up by antennae 132 and 134. It is then mixed in nonlinear device 130, which may be a diode, with the pulses gated out from AND gate 58. This produces a composite signal which is radiated by antennae 132 and 134 as signal 126 to remote equipment antenna 110 and treated as described above.

Having described the presently preferred embodiments of the invention, it should be understood that various changes in construction and arrangement will be apparent to those skilled in the art and are fully contemplated herein without departing from the true spirit of the invention. Accordingly, there is covered all alternatives, modifications and equivalents as may be included within the spirit and scope of the invention as defined in the appended claims.

What is claimed is:

1. A method for beverage dispensing control and quantity monitoring comprising the steps of:
    setting re-programmable data switches disposed within a given bottle control cap for impressing therein data bits to identify that cap from others in a system of programmable control caps;
    opening a valve in the control cap;
    activating electronic circuitry disposed within the control cap that both serializes the data bits impressed therein and also transmits a radiated signal containing the serialized data bits;
    receiving in a remote location the radiated signal containing the serialized data bits; and accumulating such radiated signals from all control caps within the system in a data processing device.

2. A method for beverage dispensing control and quantity monitoring comprising the steps of:
programming a given bottle control cap with data bits to identify that cap from any others in a system of programmable control caps;
energizing in the control cap a valve opening and closing means, a valve pour timer, an oscillator, a divider connected to an oscillator output, and a shift register, said shift register wired to the output of the divider as well as an energizing power source;
serializing the data bits programmed into the control cap using the energized shift register;
passing both the serialized data bits and another output from the oscillator through an AND gate in the control cap;
gating through the AND gate pulses corresponding to the serialized data bits;
removing a DC component from the pulses;
transforming the impedance of the pulses to a level matching that of a control cap antenna;
conducting the pulse to the control cap antenna;
radiating a signal to a remote antenna;
passing the signal to a receiver amplifier;
amplifying therein the signal;
conducting the amplified signal to a data processing device;
accumulating the amplified signal in the data processing device;
closing the valve with a signal from the valve pour timer; and
shutting off power to all power consuming bottle cap circuits using the signal from the valve pour timer.

3. The method of claim 2 which further comprises:
passing the pulses through chokes connected to both ends of a secondary winding the impedance transformer;
conducting the pulses to and impressing them upon a control cap nonlinear device;
transmitting HF signals from a remote oscillator connected to a directional coupler and transmitting and receiving antenna;
receiving the HF signal with the control cap antenna;
mixing in the control cap nonlinear device said HF signals and the pulses impressed thereon, creating thereby a composite signal;
radiating that signal as a composite to the remote transmitting and receiving antenna;
passing the composite signal through the directional coupler to an HF detector;
removing the HF signals from the composite signal using the HF detector; and
conducting an output of the HF detector to the receiver amplifier.

4. An apparatus for beverage dispensing control and quantity monitoring comprising:
at least one bottle control cap having therein a flow passage valve, venting means, and reprogrammable data switches to program the control cap with data bits to identify that cap from others in a system of programmable control caps;
disposed within the control cap all electronic circuitry to both serialize the data bits and transmit a radiated signal containing the serialized bits; and
a data processing device in a remote location equipped with means to receive and accumulate radiated signals from all control caps within the system.

5. An apparatus for beverage dispensing control and quantity monitoring comprising:
at least one bottle control cap having therein a flow passage, a valve and venting means;
at least one bottle cap power source contact;
a pour switch between the power source contact and both a bottle cap monopulse generator and a latch powering all bottle cap power consuming circuits;
bottle cap internal connections from the monopulse generator to all of a pour timer, a reset contact on a divider, and a load contact on a shift register;
bottle cap valve opening and closing means in operative relationship to the valve and power source contact connected respectively to a first and a second output from the valve pour timer, said second output also connected to a latch reset contact severing power to all bottle cap power consuming circuits;
a first oscillator located in the bottle cap, powered from the latch, having an output connected to a clock contact on the divider and into a first input of an AND gate;
a divider output connected to a clock contact on the shift register;
a plurality of limited access data programming switches, each in contact with at least one parallel input to the shift register;
a serial output from the shift register connected to a second input to the AND gate;
an AND gate output connected through a DC component removing capacitor and impedance reducing transformer to a bottle cap antenna;
data processing device located at a remote position from the bottlecap;
a receiver amplifier having an output connected to a data processing device input;
an antenna connected to a receiver amplifier input, said antenna located at a position remote from the bottlecap, but within range of a signal from the bottlecap antenna.

6. The apparatus of claim 5, which further comprises:
in the bottlecap, chokes connected to both ends of a secondary winding of the impedance transformer;
outputs from the choke connected across a non-linear device;
the antenna divided into two parts, one part connected to each side of the nonlinear device;
in the remote location, a second oscillator;
a directional coupler connected to all of an output from the second oscillator, the remote antenna, and an HF detector; and
an HF detector output connected to the receiver amplifier.

* * * * *